United States Patent
Adachi et al.

(10) Patent No.: US 10,182,172 B2
(45) Date of Patent: Jan. 15, 2019

(54) IMAGE PROCESSING APPARATUS CONFIGURED TO TRANSMIT NOTIFICATION DATA TO MOBILE TERMINAL

(71) Applicant: BROTHER KOGYO KABUSHIKI KAISHA, Nagoya-shi, Aichi-ken (JP)

(72) Inventors: Toyoshi Adachi, Kakamigahara (JP); Tetsuya Okuno, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/635,254

(22) Filed: Jun. 28, 2017

(65) Prior Publication Data
US 2018/0007229 A1 Jan. 4, 2018

(30) Foreign Application Priority Data

Jul. 1, 2016 (JP) .................................. 2016-131448

(51) Int. Cl.
G06F 3/12 (2006.01)
H04N 1/00 (2006.01)
H04N 1/32 (2006.01)

(52) U.S. Cl.
CPC ..... *H04N 1/32662* (2013.01); *H04N 1/00307* (2013.01); *H04N 1/00344* (2013.01); *H04N 1/32122* (2013.01); *H04N 1/32635* (2013.01); H04N 2201/006 (2013.01); H04N 2201/0055 (2013.01); H04N 2201/0094 (2013.01); H04N 2201/3249 (2013.01); H04N 2201/3284 (2013.01)

(58) Field of Classification Search
CPC .......... H04N 1/32662; H04N 1/00307; H04N 1/00344; H04N 1/32122; H04N 1/32635
USPC ........................................ 358/1.1–1.18, 402
See application file for complete search history.

(56) References Cited

U.S. PATENT DOCUMENTS 8,855,557 B2 * 10/2014 Moosavi .................. H04B 5/00 455/41.1
9,071,971 B2 * 6/2015 Caceres ................ H04W 12/08
(Continued)

FOREIGN PATENT DOCUMENTS

JP 2015-126491 A 7/2015

*Primary Examiner* — Gabriel Garcia
(74) *Attorney, Agent, or Firm* — Scully, Scott, Murphy & Presser, P.C.

(57) ABSTRACT

An image processing apparatus performs: acquiring instruction data including notification data and location information indicative of a location of next instruction data; controlling at least one of a display and an image processor to perform an operation instructed by the instruction data acquired most recently; when controlling the at least one of the display and the image processor, connecting a first communication interface with a mobile terminal within a particular distance range from the image processing apparatus, in accordance with a near-field wireless communication protocol; when controlling, transmitting the notification data extracted from the instruction data acquired most recently, to the mobile terminal through the first communication interface, the notification data being data for specifying an operation to be performed by the mobile terminal; and acquiring the next instruction data based on the location information extracted from the instruction data acquired most recently.

13 Claims, 14 Drawing Sheets

(56) References Cited

U.S. PATENT DOCUMENTS

| | | | |
|---|---|---|---|
| 2013/0258390 A1* | 10/2013 | Suzuki | H04N 1/00912 358/1.14 |
| 2014/0213190 A1* | 7/2014 | Yamaoka | G06F 3/1204 455/41.3 |
| 2014/0335784 A1* | 11/2014 | Ozenne | H04B 5/0031 455/41.1 |
| 2015/0188611 A1 | 7/2015 | Tsuzuki | |

* cited by examiner

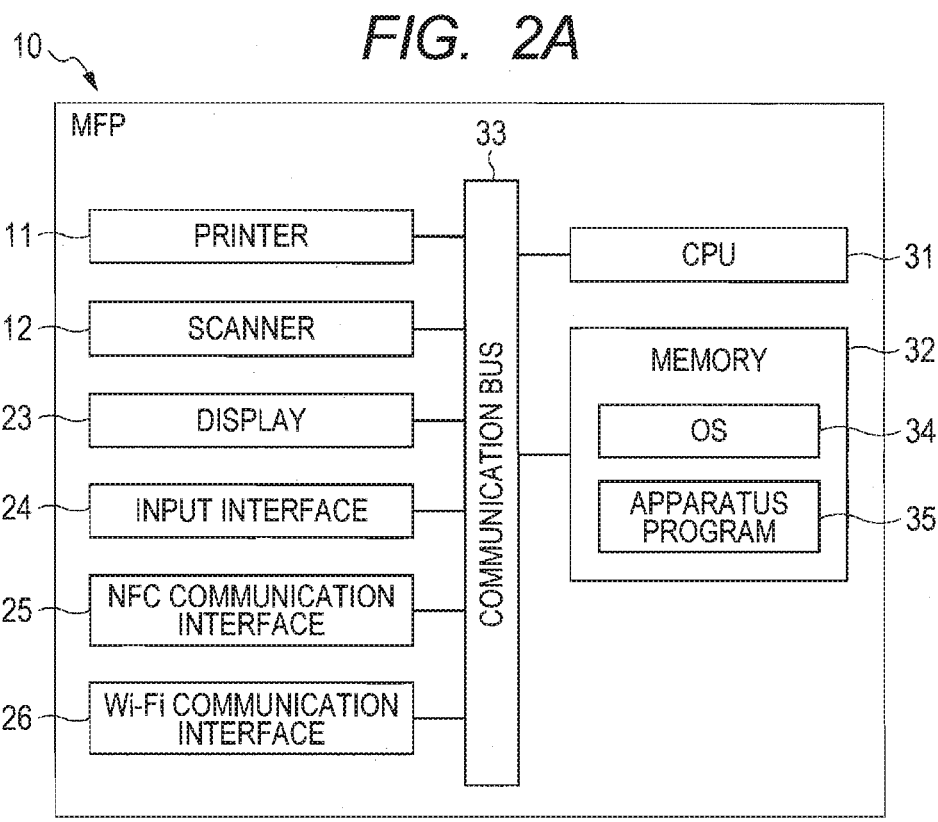
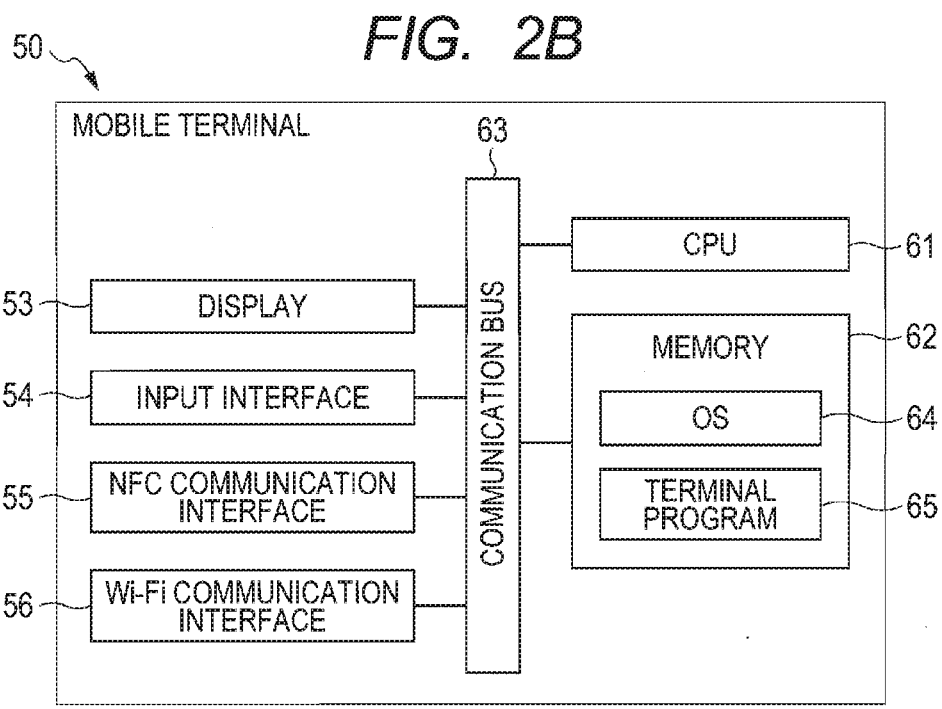

FIG. 3A

| PROGRAM ID | ADDRESS INFORMATION |
|---|---|
| SCAN UPLOAD | http://www.server-a.com/scan-upload1.xml |
| DOWNLOAD PRINT | http://www.server-a.com/download-print1.xml |

FIG. 3B

| STATE ID | PRESET URL | CUSTOMIZE URL |
|---|---|---|
| INK LOW | http://www.server-a.com/nfcpush.html?stateid=ink-low | http://www.server-b.com/nfcpush.html?stateid=ink-low |
| JAM | http://www.server-a.com/nfcpush.html?stateid=sheet-jam | — |
| ... | ... | ... |

FIG. 3C

| SCREEN DATA | PRESET URL | CUSTOMIZE URL |
|---|---|---|
| MAIN | http://www.server-a.com/nfcpush.html?displayid=main | — |
| SERVICE SELECTION | http://www.server-a.com/nfcpush.html?displayid=select | http://www.server-b.com/nfcpush.html?displayid=select |
| ... | ... | ... |

FIG. 4A

SCREEN INSTRUCTION XML <scan-upload1.xml>

```
<Screen>
  <NextURL>http://www.server-a.com/scan-upload2.xml?jobid=abc<NextURL>
  <Title> TYPE SELECTION SCREEN </Title>
  <Message> SELECT FILE TYPE. </Message>
  <List id="file_type">
    <Option val="1">PDF</Option>
    <Option val="2">TIFF</Option>
    <Option val="3">JPEG</Option>
  </List>
  <NFCPUSH>
    <PUSHURL>http://www.server-a.com/help.html?jobid=abc&displayid=001</PUSHURL>
  </NFCPUSH>
</Screen>
```

FIG. 4B

OPERATION INSTRUCTION XML <scan-upload2.xml>

```
<Command>
  <NextURL>http://www.server-a.com/scan-upload3.xml?jobid=abc<NextURL>
  <Scan upload>
    <Server>ftp://www.server-c.com</Server>
    <Resolution>300dpi</Resolution>
    <Type>PDF</Type>
  </Scan upload>
  <Screen>
    <Title> OPERATION-IN-PROGRESS SCREEN </Title>
    <Message>
      SCAN UPLOAD IS IN PROGRESS.
      HOLD MOBILE TERMINAL NEAR MFP TO CHECK PROGRESS STATUS.
    </Message>
  </Screen>
  <NFCPUSH>
    <PUSHURL>http://%localhost%/progress.html?jobid=abc</PUSHURL>
  </NFCPUSH>
</Command>
```

FIG. 5A

SCREEN INSTRUCTION XML <scan-upload3.xml>

```
<Screen>
  <NextURL>http://www.server-a.com/scan-upload4.xml?jobid=abc</NextURL>
  <Title> RESULT CONFIRMATION SCREEN </Title>
  <Image>http://www.server-c.com/scan.pdf</Image>
  <List id="icon">
    <Option val="1"> RESCAN </Option>
    <Option val="2"> END </Option>
  </List>
  <NFCPUSH>
    <PUSHURL>http://www.server-a.com/result.html?jobid=abc&displayid=003</PUSHURL>
    <NextURL>http://www.server-a.com/scan-upload5.xml?jobid=abc</NextURL>
  </NFCPUSH>
</Screen>
```

FIG. 5B

SCREEN INSTRUCTION XML <scan-upload5.xml>

```
<Screen>
  <NextURL>http://www.server-a.com/scan-upload6.xml?jobid=abc</NextURL>
  <Title> WAITING SCREEN </Title>
  <Message> OPERATE MOBILE TERMINAL. </Message>
</Screen>
```

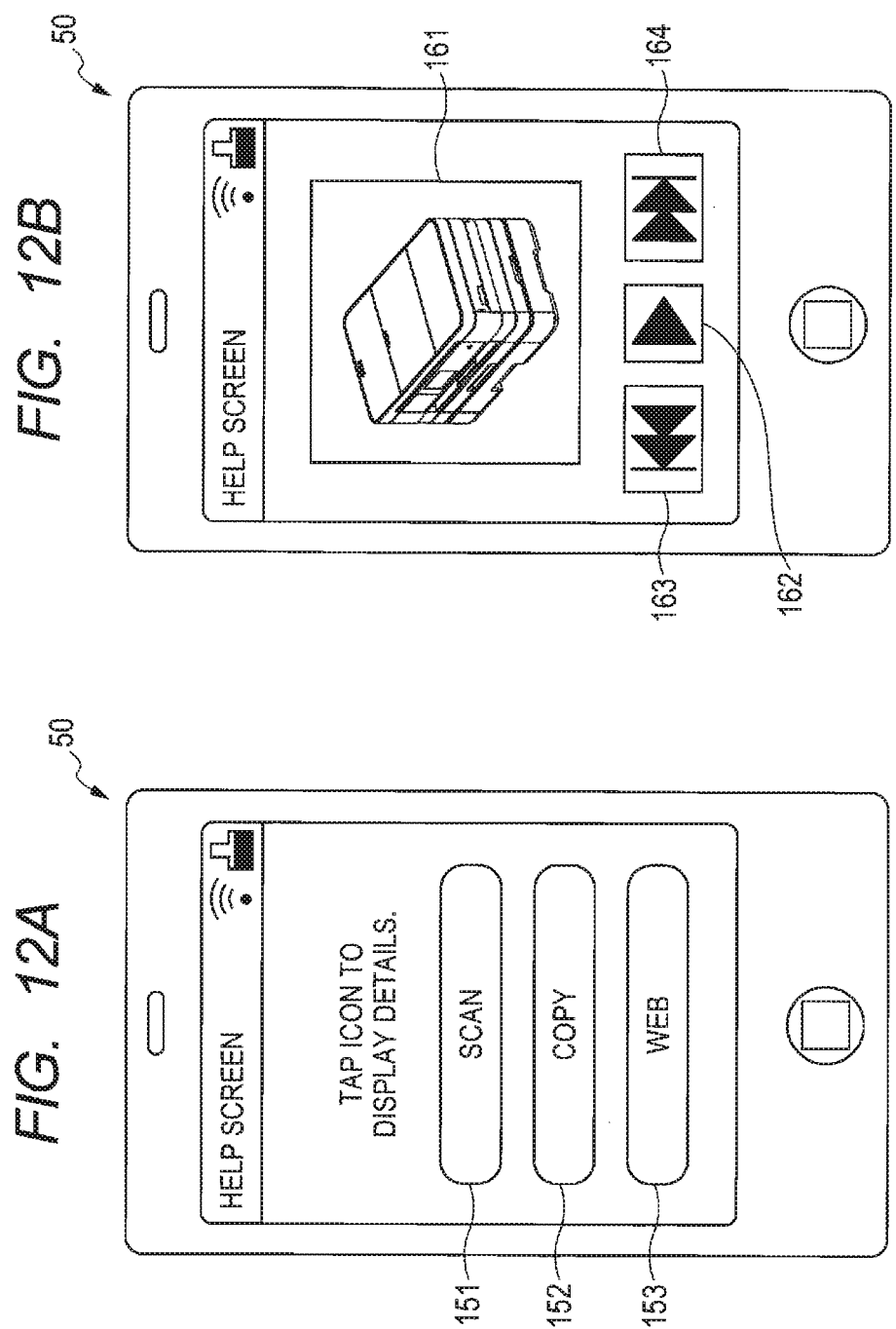

IMAGE PROCESSING APPARATUS CONFIGURED TO TRANSMIT NOTIFICATION DATA TO MOBILE TERMINAL

CROSS REFERENCE TO RELATED APPLICATIONS

This application claims priority from Japanese Patent Application No. 2016-131448 filed Jul. 1, 2016. The entire content of the priority application is incorporated herein by reference.

TECHNICAL FIELD

This disclosure relates to an image processing apparatus configured to transmit information to a mobile terminal by near-field wireless communication. This disclosure also relates to a storage medium storing a set of program instructions and a method of transmitting information to a mobile terminal from an image processing apparatus.

BACKGROUND

For example, when a mobile terminal is held near a multifunction peripheral, the multifunction peripheral transmits information indicative of an operation to be performed, to the mobile terminal, by NFC communication. The information transmitted from the multifunction peripheral to the mobile terminal is a URL of a Web page indicative of a solution of an error state of the multifunction peripheral, and so on. The mobile terminal receives the Web page indicated by the received URL from a server, and displays the received Web page on a display.

SUMMARY

According to one aspect, this specification discloses an image processing apparatus. The image processing apparatus includes a display, an image processor configured to perform an image processing operation of image data, a first communication interface, a processor, and a memory storing instructions. When executed by the processor, the instructions cause the processor to perform: acquiring instruction data, the instruction data including notification data and location information indicative of a location of next instruction data; controlling at least one of the display and the image processor to perform an operation instructed by the instruction data acquired most recently; when controlling the at least one of the display and the image processor, connecting the first communication interface with a mobile terminal within a particular distance range from the image processing apparatus, in accordance with a near-field wireless communication protocol; when controlling the at least one of the display and the image processor, transmitting the notification data extracted from the instruction data acquired most recently, to the mobile terminal through the first communication interface, the notification data being data for specifying an operation to be performed by the mobile terminal; and acquiring the next instruction data based on the location information extracted from the instruction data acquired most recently.

According to another aspect, this specification also discloses a non-transitory computer-readable storage medium storing a set of program instructions executable on an image processing apparatus having a display, an image processor configured to perform an image processing operation of image data, and a first communication interface. The set of program instructions includes: acquiring instruction data, the instruction data including notification data and location information indicative of a location of next instruction data; controlling at least one of the display and the image processor to perform an operation instructed by the instruction data acquired most recently; when controlling the at least one of the display and the image processor, connecting the first communication interface with a mobile terminal within a particular distance range from the image processing apparatus, in accordance with a near-field wireless communication protocol; when controlling the at least one of the display and the image processor, transmitting the notification data extracted from the instruction data acquired most recently, to the mobile terminal through the first communication interface, the notification data being data for specifying an operation to be performed by the mobile terminal; and acquiring the next instruction data based on the location information extracted from the instruction data acquired most recently.

According to still another aspect, this specification also discloses a method of transmitting information to a mobile terminal from an image processing apparatus having a display, an image processor configured to perform an image processing operation of image data, and a first communication interface. The method includes: acquiring instruction data, the instruction data including notification data and location information indicative of a location of next instruction data; controlling at least one of the display and the image processor to perform an operation instructed by the instruction data acquired most recently; when controlling the at least one of the display and the image processor, connecting the first communication interface with the mobile terminal within a particular distance range from the image processing apparatus, in accordance with a near-field wireless communication protocol; when controlling the at least one of the display and the image processor, transmitting the notification data extracted from the instruction data acquired most recently, to the mobile terminal through the first communication interface, the notification data being data for specifying an operation to be performed by the mobile terminal; and acquiring the next instruction data based on the location information extracted from the instruction data acquired most recently.

BRIEF DESCRIPTION OF THE DRAWINGS

Embodiments in accordance with this disclosure will be described in detail with reference to the following figures wherein:

FIG. 2A is a functional block diagram of an MFP 10;

FIG. 2B is a functional block diagram of a mobile terminal 50;

FIGS. 3A to 3C show an example of information stored in a memory 32, wherein FIG. 3A shows a program list, FIG. 3B shows a state list, and FIG. 3C shows a screen list;

FIGS. 4A and 4B show instruction data stored in a server 70, wherein FIG. 4A shows screen instruction data and FIG. 4B shows operation instruction data;

FIGS. 5A and 5B show screen instruction data stored in the server 70;

FIGS. 9A and 9B show display examples of a display 23, wherein FIG. 9A shows a main screen and FIG. 9B shows a service selection screen;

FIGS. 10A and 10B show display examples of the display 23, wherein FIG. 10A shows a type selection screen and FIG. 10B shows an operation-in-progress screen;

FIGS. 11A and 11B show display examples of the display 23, wherein FIG. 11A shows a result confirmation screen and FIG. 11B shows a waiting screen;

FIGS. 12A and 12B show help screens displayed on a display 53; and

FIGS. 13A and 13B show display examples of the display 53, wherein FIG. 13A shows a progress report screen and FIG. 13B shows a result confirmation screen.

DETAILED DESCRIPTION

The above-described multifunction peripheral transmits information prestored in a firmware to the mobile terminal by NFC communication. However, in a common multifunction peripheral, it is more difficult to update firmware than a general-purpose machine such as a PC. That is, in the above-described multifunction peripheral, there are no many variations of information that can be provided to the mobile terminal.

In view of the foregoing, an example of an object of this disclosure is to provide an image processing apparatus configured to transmit, to a mobile terminal, various notification data depending on a state of the image processing apparatus, by near-field wireless communication.

An aspect of this disclosure will be described while referring to the accompanying drawings.

Figure 1:
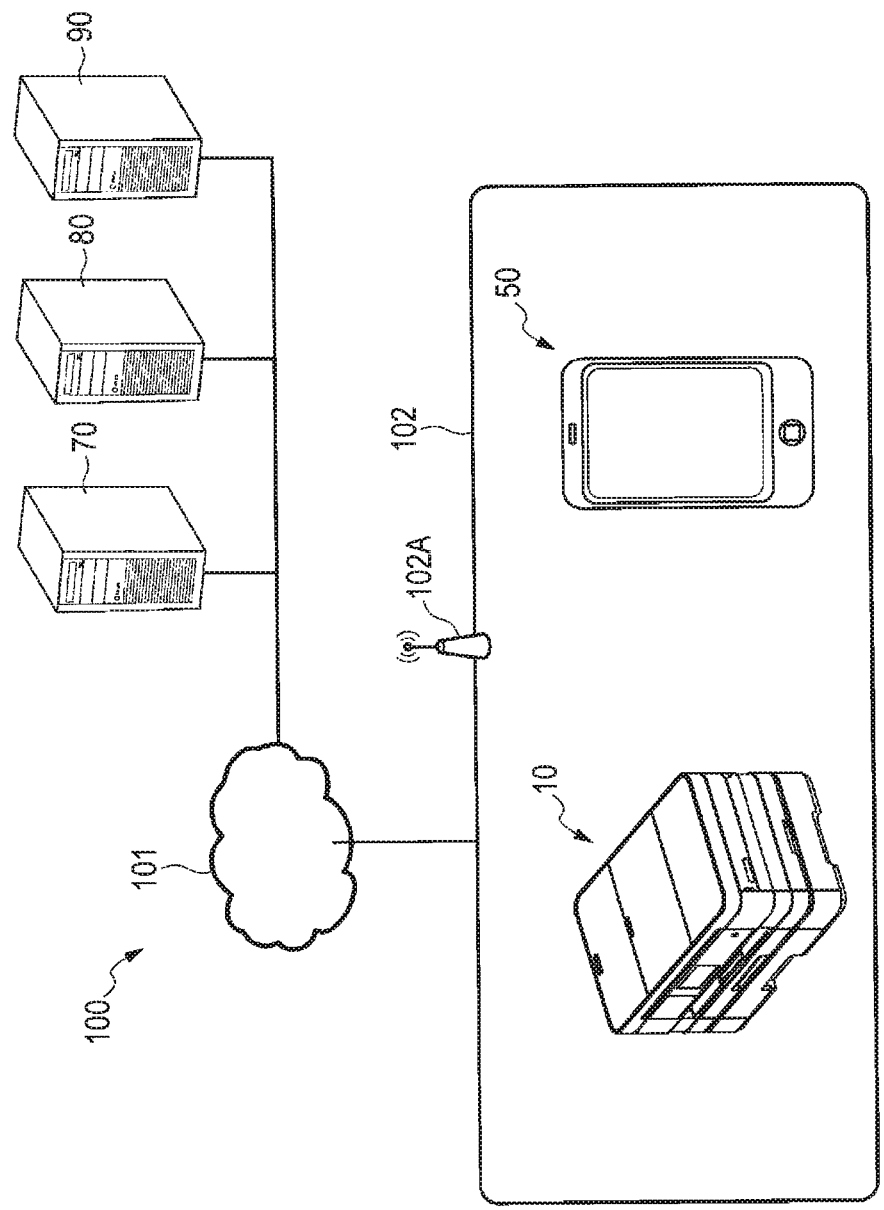
FIG. 1 is a diagram showing an overview of a system 100 according to an embodiment.

A system 100 shown in FIG. 1 includes an MFP (Multifunction Peripheral) 10, a mobile terminal 50, and servers 70, 80, and 90. The MFP 10, the mobile terminal 50, and the servers 70 to 90 communicate with one another through a communication network. A specific example of the communication network is not limited, but may be Internet 101, a wired LAN, a wireless LAN 102, or a combination thereof, for example.

The MFP 10 and the mobile terminal 50 belong to the wireless LAN 102. That is, the MFP 10 and the mobile terminal 50 communicate with each other through an access point (not shown) of the wireless LAN 102. The wireless LAN 102 is connected to the Internet 101 through a router 102A. The servers 70 to 90 are connected to the Internet 101. That is, the MFP 10 and the mobile terminal 50 communicate with the servers 70 to 90 through the router 102A and the Internet 101.

As shown in FIG. 2A, the MFP 10 mainly includes a printer 11, a scanner 12, a display 23, an input interface 24, an NFC communication interface 25, a Wi-Fi™ (a trademark of Wi-Fi Alliance) communication interface 26, a CPU 31, a memory 32, and a communication bus 33. Each element constituting the MFP 10 is connected to one another through the communication bus 33. The MFP 10 is an example of an image processing apparatus. The printer 11 and the scanner 12 are examples of an acting unit and an image processor.

The printer 11 performs a print operation of recording an image represented by image data on a sheet. As the recording method of the printer 11, known methods such as an inkjet method and an electro-photographic method may be adopted. The scanner 12 performs a scan operation of reading an image recorded on an original document and generating scan data. The MFP 10 further performs a copy operation of controlling the scanner 12 to perform the scan operation and controlling the printer 11 to perform the print operation for the generated scan data. The print operation, the scan operation, and the copy operation are examples of an image processing operation for image data.

The display 23 is a liquid crystal display, an organic EL display, or the like. The display 23 is an example of an acting unit having a display screen that displays various kinds of information.

The input interface 24 is a user interface that receives an input operation by a user. Specifically, the input interface 24 has buttons, and outputs various operation signals associated with pressed buttons to the CPU 31. Further, the input interface 24 may have a film-like touch sensor that overlaps the display screen of the display 23. An operation of specifying an object displayed on the display screen of the display 23, and an operation of inputting a character string or a number string are examples of a user operation. The "object" includes a character string, an icon, a button, a link, a radio button, a check box, a pull-down menu, and so on, displayed on the display 23.

The input interface 24 realized as a touch sensor outputs position information indicative of a position on the display screen touched by the user. Here, "touch" in the present specification includes overall operations of causing an input medium to touch the display screen. The "touch" also includes "hover" or "floating" that causes an input medium to be proximate to a position where the distance between the input medium and the display screen is very small, although the input medium does not touch the display screen. Further, the input medium may be a finger of a user, a touch pen, or the like. The user operation of tapping the position of an icon displayed on the display 23 is an example of a designating operation of designating that icon.

The NFC communication interface 25 is an example of a first communication interface configured to transmit and receive wireless signals in a near-field wireless method with an external apparatus. The NFC communication interface 25 performs wireless communication compatible with the NFC standard (hereinafter referred to as "NFC communication"), for example. That is, the MFP 10 transmits various kinds of information to the mobile terminal 50 through the NFC communication interface 25, and receives various kinds of information from the mobile terminal 50 through the NFC communication interface 25. The NFC standard is the ISO/IEC21481 or 18092 standard, for example. The NFC communication is an example of near-field wireless communication. The NFC standard is an example of a near-field wireless communication protocol. Instead of the NFC standard, the TransferJet™ (trademark of TransferJet consortium) standard may be adopted.

The Wi-Fi communication interface 26 is an example of a second communication interface configured to communicate with an external apparatus. The Wi-Fi communication interface 26 performs wireless communication compatible with the Wi-Fi standard (hereinafter referred to as "Wi-Fi communication"), for example. The MFP 10 outputs various kinds of information to the mobile terminal 50 and the servers 70 to 90 through the Wi-Fi communication interface 26, and receives various kinds of information from the mobile terminal 50 and the servers 70 to 90 through the Wi-Fi communication interface 26. The communication range of the Wi-Fi communication is larger than the communication range of the NFC communication. The communication speed of the Wi-Fi communication is faster than the communication speed of the NFC communication.

The CPU 31 controls overall operations of the MFP 10. The CPU 31 acquires various programs described later from the memory 32 and executes the programs based on various signals outputted from the input interface 24, various information acquired from an external apparatus through the communication interfaces 25, 26, and so on. That is, the CPU 31 and the memory 32 constitute an example of a controller.

The memory 32 stores an OS 34 and an apparatus program 35. The apparatus program 35 may be a single program or may be a set of a plurality of programs. The memory 32 stores data or information needed to perform the apparatus program 35. For example, the memory 32 includes a RAM, a ROM, an EEPROM, a HDD, a portable storage medium detachably mounted on the MFP 10 such as a USB memory, a buffer of the CPU 31, or a combination thereof.

The memory 32 may be a computer-readable storage medium. The computer-readable storage medium is a non-transitory medium. The non-transitory medium also includes a recording medium such as CD-ROM and DVD-ROM, in addition to the above-mentioned examples. The non-transitory medium is a tangible medium. On the other hand, an electric signal that conveys a program downloaded from a server on the Internet 101 is a computer-readable signal medium that is one type a computer-readable medium, but is not included in a non-transitory computer-readable storage medium.

As shown in FIG. 3A, the memory 32 is configured to store a program list, for example. The program list includes one or more program record. For example, the program record may be already stored at the time of shipment of the MFP 10, or may be stored by the user through the input interface 24 or the Wi-Fi communication interface 26.

The program record includes a program ID and address information corresponding to the program ID. The program ID is information for identifying an extended program provided by the server 70. The address information is an example of location information indicative of the location of instruction data used for an extended program identified by the program ID. For example, the address information may be a URL format including server identification information that identifies the server 70 that stores instruction data (for example, "www.server-a.com") and file path information indicative of a location path of instruction data (for example, "scan-upload1.xml").

As one example, the extended program identified by a program ID "scan upload" causes the MFP 10 to perform an operation of transmitting image data generated by the scanner 12 in a scan operation to a server through the Wi-Fi communication interface 26. As another example, the extended program identified by a program ID "download print" causes the MFP 10 to perform an operation that the printer 11 records, on a sheet, an image represented by image data received from a server through the Wi-Fi communication interface 26.

As shown in FIG. 3B, for example, the memory 32 is configured to store a state list. The state list includes one or more state record. For example, the state record is already stored at the time of shipment of the MFP 10, and may be changed by the user through the input interface 24 or the Wi-Fi communication interface 26. The state record includes a state ID, a preset URL, and a customize URL.

As shown in FIG. 3C, for example, the memory 32 is configured to store a screen list. The screen list includes one or more screen record. For example, the screen record is already stored at the time of shipment of the MFP 10, and may be changed by the user through the input interface 24 or the Wi-Fi communication interface 26. The screen record includes screen data, a preset URL, and a customize URL.

The state ID is an example of state identification information indicative of a particular state of an image processor. For example, a state ID "ink low" indicates a state where an amount of ink in an ink cartridge mounted on the printer 11 is less than a threshold value. A state ID "jam" indicates a state where an original document cannot be conveyed in an ADF of the scanner 12. The state of the image processor is detected by a sensor provided in the image processor, for example.

The screen data indicates a particular screen that is displayed on the display 23. The screen data "main" indicates a main screen shown in FIG. 9A, for example. The screen data "service selection" indicates a service selection screen shown in FIG. 9B, for example. That is, the MFP 10 causes the display 23 to display a screen indicated by screen data stored in the memory 32.

The preset URL and the customize URL are examples of location information indicative of the location of instruction data. The preset URL is information that is already stored at the time of shipment of the MFP 10, for example, and that cannot be changed by the user. The customize URL is information that is not stored at the time of shipment of the MFP 10, for example, and that is stored by the user through the input interface 24 or the Wi-Fi communication interface 26. That is, the customize URL may be or may not be included in the state record and the screen record. The preset URL is an example of first notification data, and the customize URL is an example of second notification data.

As shown in FIG. 2B, the mobile terminal 50 mainly includes a display 53, an input interface 54, an NFC communication interface 55, a Wi-Fi communication interface 56, a CPU 61, a memory 62, and a communication bus 63. The display 53, the input interface 54, the NFC communication interface 55, the Wi-Fi communication interface 56, the CPU 61, the memory 62, and the communication bus 63 of the mobile terminal 50 have configurations similar to those of the display 23, the input interface 24, the NFC communication interface 25, the Wi-Fi communication interface 26, the CPU 31, and the memory 32, and the communication bus 33 of the MFP 10. Thus, detailed descriptions are omitted. The CPU 61 and the memory 62 are an example of the controller.

The mobile terminal 50 is a mobile phone, a smartphone, or a tablet device, for example. More specifically, the display 53 of the mobile terminal 50 has a screen size of preferably 12 inch or smaller, more preferably 8 inch or smaller. The input interface 54 of the mobile terminal 50 is preferably a touch sensor overlapped on the display screen of the display 53.

The memory 62 stores an OS 64 and a terminal program 65. The OS 64 may be Android™ (trademark of Google Inc.) OS, iOS™ (trademark of Cisco Systems, Inc.), or Windows Phone™ (trademark of Microsoft Corporation) Operating System, for example.

The NFC communication interface 25 of the MFP 10 in the embodiment performs a Poll operation. The Poll operation is an operation of repeatedly outputting a polling signal at a particular time interval and monitoring a response signal that is the response to the polling signal. The NFC communication interface 55 of the mobile terminal 50 in the embodiment performs a Listen operation. The Listen operation is an operation of monitoring a polling signal and outputting a response signal in response to receiving the polling signal.

When the MFP 10 and the mobile terminal 50 get close, the NFC communication interface 55 of the mobile terminal 50 receives a polling signal outputted by the NFC communication interface 25 of the MFP 10, and the NFC communication interface 25 of the MFP 10 receives a response signal outputted by the NFC communication interface 55 of the mobile terminal 50. Thereby, a communication link of the NFC method (hereinafter referred to as "NFC link") is established between the MFP 10 and the mobile terminal 50 by a particular procedure in accordance with the NFC standard. Establishing the NFC link is an example of near-field wireless connection. After that, the MFP 10 and the mobile terminal 50 transmits and receives information and so on, through this NFC link. Note that the MFP 10 may perform the Listen operation, and the mobile terminal 50 may perform the Poll operation.

The server 70 stores XML files shown in FIGS. 4A to 5B in a server memory, for example. The server 80 stores HTML files (not shown) in a server memory. In response to request of transmission of a file by the MFP 10 or the mobile terminal 50, the server 70, 80 transmits the requested file to the MFP 10 or the mobile terminal 50. The server 70, 80 is a so-called Web server that transmits files by HTTP, for example. However, the protocol of transmitting files is not limited to HTTP, but may be CIFS (abbreviation of Common Internet File System) and so on. The server 90 is a so-called storage server. The server 90 stores, in a server memory, scan data transmitted from the MFP 10, for example.

The XML files shown in FIGS. 4A to 5B are examples of instruction data in a text format used for an extended program. The instruction data is basically classified into screen instruction XML shown in FIGS. 4A, 5A, and 5B and operation instruction XML shown in FIG. 4B. The screen instruction XML is an example of screen instruction data that instructs displaying a designation screen on the display 23 of the MFP 10. The operation instruction XML is an example of operation instruction data that instructs an operation using an image processor (the printer 11 or the scanner 12 in this embodiment). The instruction data may be binary data or binarized text data, or may be a CSV format or a unique format designed for an extended program.

In the embodiment, the server 70 is identified by server identification information "www.server-a.com", the server 80 is identified by server identification information "www.server-b.com", and the server 90 is identified by server identification information "www.server-c.com". The servers 70 to 90 are connected to the Internet 101 in the embodiment, but are not limited to this configuration. The servers 70 to 90 may belong to the LAN 102. The servers 70 to 90 may be formed by hardware configurations different from each other, or may be formed by a plurality of server programs that runs on a single hardware unit.

The operation of the system 100 in the embodiment will be described while referring to FIGS. 6A to 8. At the starting time point of processes described below, it is assumed that the MFP 10 performs the Poll operation, and the mobile terminal 50 performs the Listen operation.

The flowcharts of the present specification basically indicate processes by the CPU 31 in accordance with commands described in programs. That is, the processes such as "judge", "extract", "select", "calculate", "determine", "identify", and "control" in the following description indicate the processes performed by the CPU 31. The processes performed by the CPU 31 include hardware control through the OS 34. The "data" in the present specification is represented by a computer-readable bit string. The data having substantially the same meaning but having different formats are treated as identical data. The same goes for "information" in the present specification.

Figure 6A:
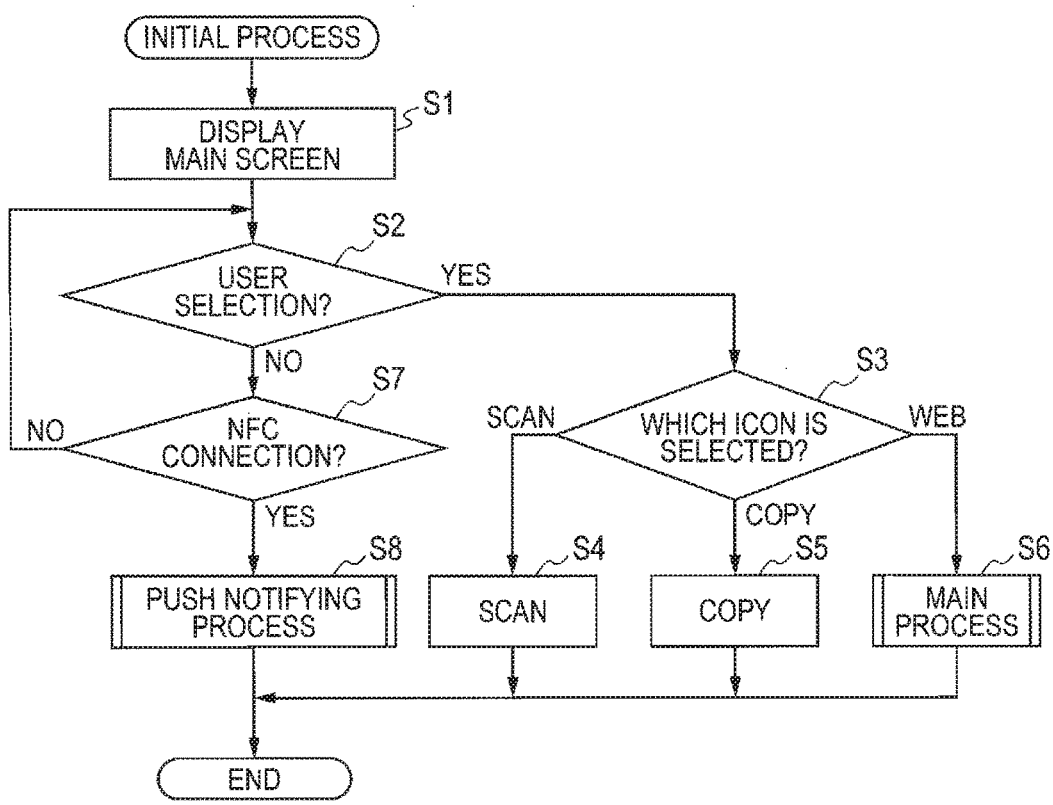
FIG. 6A shows a flowchart of an initial process.
Figure 9A:
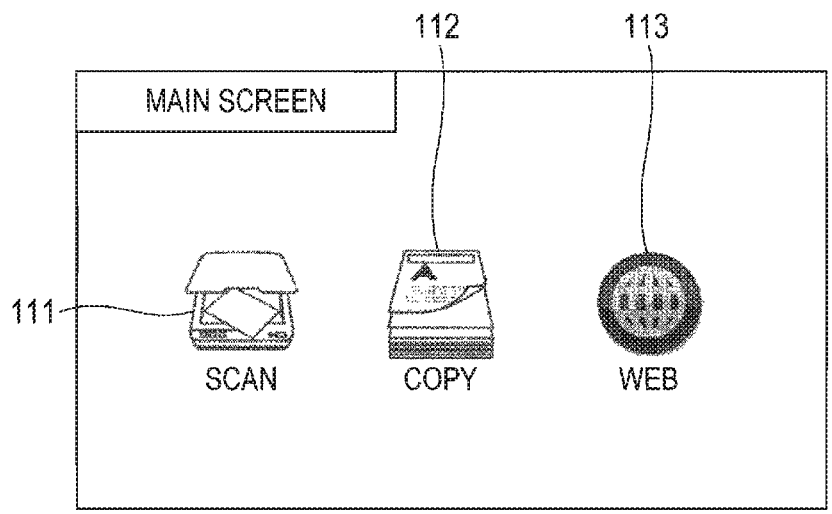
Figure 9B:
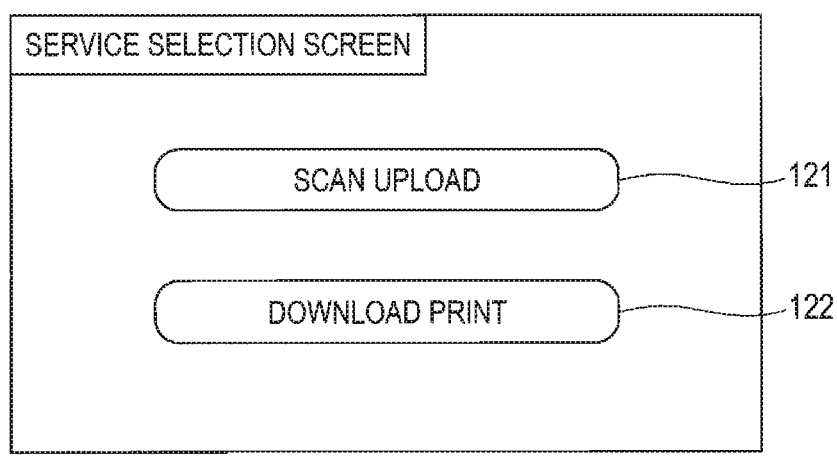

In an initial process shown in FIG. 6A, first, the apparatus program 35 of the MFP 10 displays a main screen shown in FIG. 9A on the display 23 (51). This process is an example of a displaying process. The main screen is a particular screen indicated by screen data "main" stored in the screen list. The main screen includes a [SCAN] icon 111, a [COPY] icon 112, and a [WEB] icon 113. The [SCAN] icon 111 corresponds to an instruction of performing a scan operation. The [COPY] icon 112 corresponds to an instruction of performing a copy operation. The [WEB] icon 113 corresponds to an instruction of performing an extended program provided by the server 70.

The apparatus program 35 receives a user operation on the main screen, through the input interface 24 (S2: Yes). Next, in response to receiving designation of the [SCAN] icon 111 through the input interface 24 (S3: SCAN), the apparatus program 35 causes the scanner 12 to perform the scan operation. Or, in response to receiving designation of the [COPY] icon 112 through the input interface 24 (S3: COPY), the apparatus program 35 causes the printer 11 and the scanner 12 to perform the copy operation. Further, in response to receiving designation of the [WEB] icon 113 through the input interface 24 (S3: WEB), the apparatus program 35 performs the main process that will be described later while referring to FIG. 6B (S6).

Further, when the user holds the mobile terminal 50 near the MFP 10, for example, the apparatus program 35 receives a response signal from the mobile terminal 50 through the NFC communication interface 25 that is performing the Poll operation. Next, the apparatus program 35 establishes an NFC link with the mobile terminal 50 that is the transmission source of the response signal (S7). This process is an example of a connecting process of connecting the NFC communication interface 25 with the mobile terminal 50 within a particular distance range of the MFP 10 by near-field wireless connection. In response to establishing the NFC link (S7: Yes), the apparatus program 35 performs a PUSH notifying process shown in FIG. 7 (S8). The terminal program 65 performs processes S42 to S44 in FIG. 8. Note that, while there is no user operation on the main screen (S2: No) or no NFC link is established (S7: No), the apparatus program 35 waits for a user operation or establishment of the NFC link.

Figure 7:
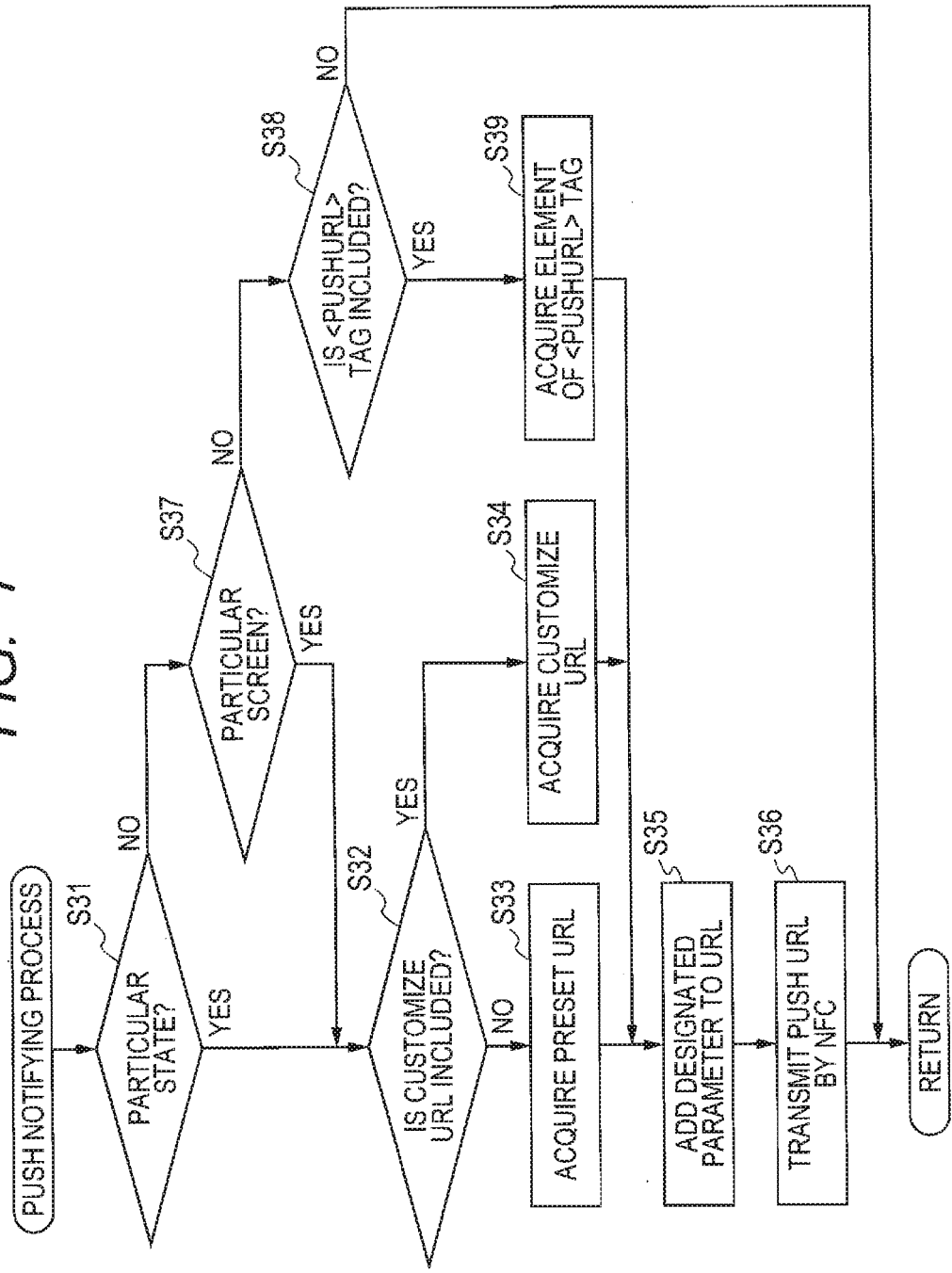
FIG. 7 shows a flowchart of a PUSH notifying process.

In the PUSH notifying process in FIG. 7, first, the apparatus program 35 determines whether the MFP 10 is in a particular state and whether the MFP 10 is displaying a particular screen (S31, S37). Next, in response to determining that the MFP 10 is not in the particular state and that the MFP 10 is displaying the main screen that is the particular screen (S31:No & S37:Yes), the apparatus program 35 determines whether the screen data "main" is associated with a customize URL (S32). The process of S31 is an example of a second determining process. The process of S32 is an example of a third determining process. The process of S37 is an example of a fourth determining process.

In response to determining that the screen data "main" is not associated with a customize URL (S32: No), the apparatus program 35 reads out, from the screen record, the preset URL corresponding to the screen data "main" (S33). Next, the apparatus program 35 adds designated parameter to the preset URL acquired in S33 (S35). In the embodiment, there is no parameter to be added, and the process of S35 will be described later. The apparatus program 35 transmits a push URL to the mobile terminal 50 through the NFC communication interface 25 for which the NFC link is established (S36). Here, the push URL is the URL acquired in S33 and to which a necessary parameter is added. The push URL is an example of notification data. This process is an example of a third notifying process.

Figure 8:
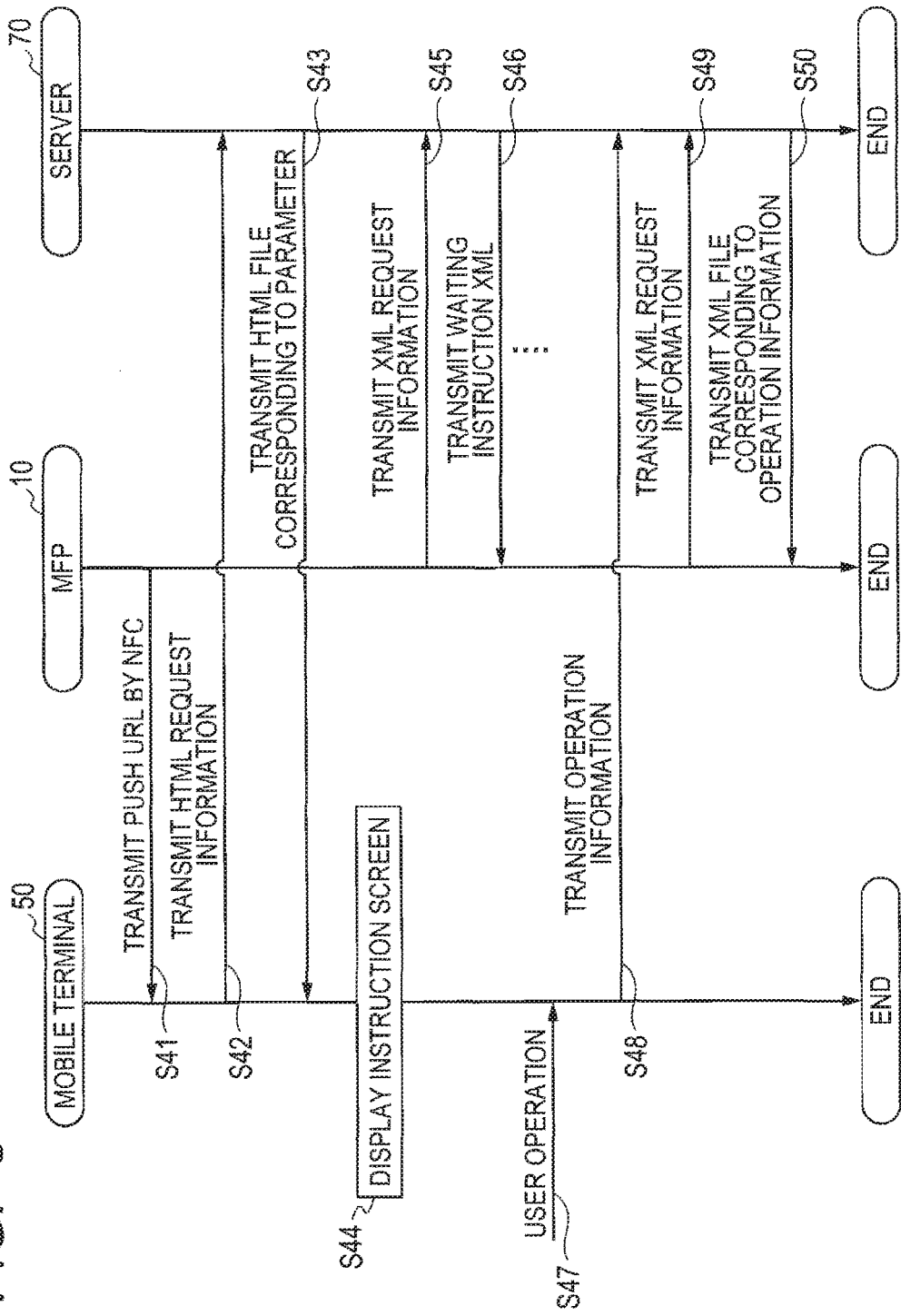
FIG. 8 shows a flowchart of a process in which the MFP 10, the mobile terminal 50, and the server 70 cooperate.

Next, as shown in FIG. 8, the terminal program 65 of the mobile terminal 50 receives the push URL from the MFP 10 through the NFC communication interface 55 for which the NFC link is established (S41). Next, the terminal program 65 transmits HTML request information through the Wi-Fi communication interface 56 to the server 70 identified by server identification information "www.server-a.com" included in the push URL (S42). The HTML request information is information for requesting transmission of a HTML file (display data) identified by a combination of file path information "nfcpush.html" and a parameter "?displayid=main" included in the push URL. The terminal program 65 receives, through the Wi-Fi communication interface 56, the HTML file transmitted from the server 70 as the response to the HTML request information (S43).

Next, the terminal program 65 causes the display 53 to display a help screen shown in FIG. 12A, in accordance with the HTML file received in most recent S43 (S44). More specifically, the terminal program 65 starts up a browser program (not shown) installed in the mobile terminal 50. The browser program analyzes the received HTML file and displays the help screen. The help screen shown in FIG. 12A is an example of an instruction screen explaining how to use the main screen of the MFP 10. The help screen shown in FIG. 12A includes a message "Tap an icon to display details.", a [SCAN] icon 151, a [COPY] icon 152, and a [WEB] icon 153.

The terminal program 65 receives a user operation on the help screen through the input interface 54. In response to receiving designation of the [SCAN] icon 151 through the input interface 54, for example, the terminal program 65 receives, from the server 70, the HTML file associated with the [SCAN] icon 151, and causes the display 53 to display a screen indicated by the received HTML file. These processes are known processes for viewing a Web site by using the mobile terminal 50, and hence detailed descriptions are omitted.

[Main Process]

Figure 6B:
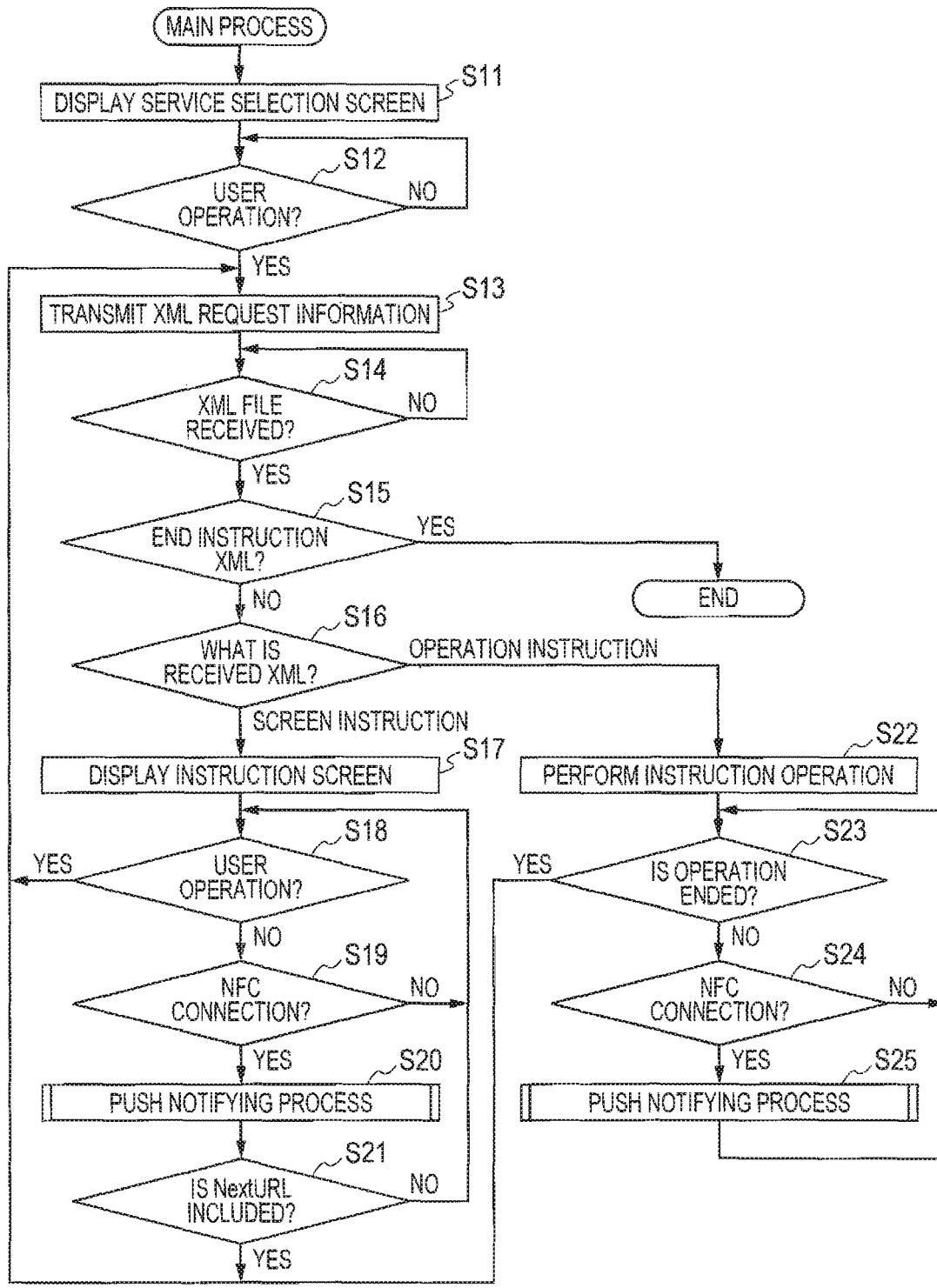
FIG. 6B shows a flowchart of a main process.

In response to receiving designation of the [WEB] icon 113 in FIG. 9A through the input interface 24, the main process shown in FIG. 6B is started. In the main process, first, the apparatus program 35 causes the display 23 to display a service selection screen shown in FIG. 9B (S11). This process is an example of a displaying process. The service selection screen is a particular screen indicated by screen data "service selection" stored in the screen list. The service selection screen includes program icons 121, 122. Each program icon 121, 122 corresponds to one of the plurality of program records stored in the program list. The apparatus program 35 receives a user operation on the service selection screen through the input interface 24 (S12).

In response to receiving designation of the program icon 121 through the input interface 24 (S12: Yes), for example, the apparatus program 35 performs the extended program identified by the program ID "scan upload". First, the apparatus program 35 reads out, from the program list, address information of the program record corresponding to the program icon 121. Next, the apparatus program 35 transmits, through the Wi-Fi communication interface 26, XML request information for requesting transmission of the XML file indicated by file path information "scan-upload1.xml" to the server 70 identified by server identification information "www.server-a.com" (S13). The XML request information that uses address information included in the program record is an example of first request information.

Although not shown in the drawings, the server 70 receives the XML request information from the MFP 10. Next, the server 70 reads out, from the server memory, the XML file indicated by file path information "scan-upload1.xml" included in the XML request information. The server 70 also generates a job ID "abc". The job ID is information for uniquely identifying a job to be performed by the MFP 10. And, the server 70 transmits the read XML file and the job ID "abc" to the MFP 10 that is the transmission source of the XML request information.

Next, the apparatus program 35 receives the XML file shown in FIG. 4A and the job ID "abc", as the response to the XML request information, from the server 70 through the Wi-Fi communication interface 26 (S14). As shown in FIG. 4A, for example, the job ID "abc" may be set (provided) as parameter "jobid=abc" at the end of the URL that is set as an element of the <NextURL> tag and the <PUSHURL> tag. The process of S13 using address information included in the program record is an example of a first transmitting process. The process of S14 is an example of a receiving process. The process of S13, S14 is an example of a first acquiring process.

Next, the apparatus program 35 determines which of an end instruction XML, a screen instruction XML, and an operation instruction XML the received XML file is (S15, S16). The process of S15 and S16 is an example of a first determining process. The apparatus program 35 determines which of an <End> tag, a <Screen> tag, and a <Command> tag is described at the beginning of the XML file, for example. In response to determining that the <Screen> tag is described at the beginning of the XML file, the apparatus program 35 determines that the received XML file is the screen instruction XML (S15: No & S16: SCREEN INSTRUCTION).

As shown in FIG. 4A, the screen instruction XML includes a <NextURL> tag, a <Title> tag, a <Message> tag, a <List> tag, and a <NFCPUSH> tag, for example. The element of the <NextURL> tag is address information of instruction data to be acquired after performing the operation instructed by the screen instruction XML. The element of the <NextURL> tag directly below the <Screen> tag is an example of first location information. The element of the <Title> tag is a character string of a screen title of the instruction screen. The element of the <Message> tag is a character string that is displayed on the instruction screen.

The attribute "id" of the <List> tag is information identifying an item of parameter (for example, "file type") to be designated by the user through the instruction screen. The <List> tag includes a plurality of <Option> tags as the element. The element of the <Option> tag is a text indicative of a parameter to be designated by the user (for example, "PDF", "TIFF", and "JPEG"). The attribute "val" of the <Option> tag is a value of a parameter to be designated by the user (for example, "1", "2", and "3").

The <NFCPUSH> tag is a tag for, in response to establishment of an NFC link when an instruction screen is being displayed, instructing transmission of notification data through the NFC link. The <NFCPUSH> tag includes a <PUSHURL> tag as an element. The element of the <PUSHURL> tag is a URL to be transmitted as the notification data. As shown in FIG. 5A, for example, the <NFCPUSH> tag may further include a <NextURL> tag as an element. The element of the <NextURL> tag directly below the <NFCPUSH> tag is an example of second location information.

Figure 10A:
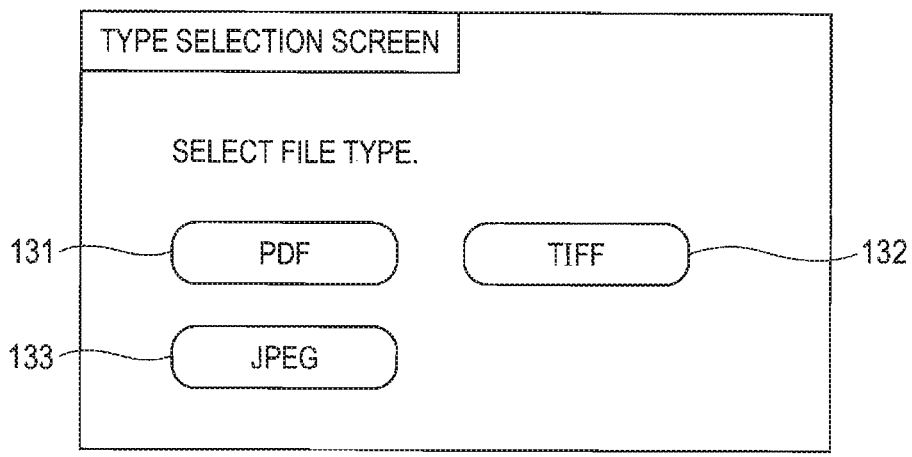

Next, the apparatus program 35 causes the display 23 to display a type selection screen shown in FIG. 10A, in accordance with the element of the <Screen> tag of the screen instruction XML received in most recent S14 (S17). The type selection screen is an example of the instruction screen for allowing the user to designate a parameter corresponding to the item "file type". The type selection screen includes parameter icons 131, 132, and 133 corresponding to respective ones of a plurality of <Option> tags. Then, the apparatus program 35 receives a user operation on the type selection screen through the input interface 24 (S18). The process of S17 is an example of an operation instructing process. The process of S18 is an example of a user-operation receiving process.

Next, for example, in response to establishment of an NFC link with the mobile terminal 50 before receiving a user operation through the input interface 24 (S18:No & S19: Yes), the apparatus program 35 performs a PUSH notifying process (S20). The process of S19 is an example of a connecting process. Hereinafter, detailed descriptions that are the same as the above-described processes are omitted, and different points will be mainly described.

In FIG. 7, first, in response to determining that the printer 11 is in an ink low state, for example, and that the state ID "ink low" is associated with a customize URL (S31:Yes & S32:Yes), the apparatus program 35 reads out the customize URL from the state record and adds a necessary parameter to the read URL (S34 & S35) to generate a push URL. The apparatus program 35 then transmits the push URL to the mobile terminal 50 through the NFC communication interface 25 for which the NFC link is established (S36). This process is an example of a second notifying process.

Next, as shown in FIG. 8, the terminal program 65 receives the push URL from the MFP 10 through the NFC communication interface 55 for which the NFC link is established (S41). Next, the terminal program 65 transmits HTML request information for requesting transmission of the HTML file identified by a combination of file path information "nfcpush.html" and a parameter "?stateid=inklow" included in the push URL, through the Wi-Fi communication interface 56, to the server 80 identified by server identification information "www.server-b.com" included in the push URL (S42). The terminal program 65 then receives, through the Wi-Fi communication interface 56, the HTML file transmitted from the server 80 as the response to the HTML request information (S43).

Next, the terminal program 65 causes the display 53 to display a help screen shown in FIG. 12B, in accordance with the HTML file received in most recent S43 (S44). The help screen shown in FIG. 12B is an example of an instruction screen for playing a movie that shows the procedure to solve the ink low state of the printer 11. The help screen shown in FIG. 12B includes a movie display region 161, a play icon 162, a rewind icon 163, and a fast-forward icon 164. In response to receiving designation of the play icon 162 through the input interface 54, for example, the terminal program 65 plays the movie received from the server 80 in the movie display region 161.

Returning to FIG. 6B, the apparatus program 35 determines whether a <NextURL> tag is included in the element of the <NFCPUSH> tag of the instruction data received in most recent S14 (S21). In response to determining that no<NextURL> tag is included in the element of the <NFCPUSH> tag (S21: No), the apparatus program 35 continues displaying the type selection screen until a user operation on the type selection screen shown in FIG. 10A is received. In response to receiving designation of the parameter icon 131 through the input interface 24, for example (S18: Yes), the apparatus program 35 acquires next instruction data (S13 & S14). Note that designation of the parameter icons 131 to 133 may be performed before the NFC link is established between the MFP 10 and the mobile terminal 50.

More specifically, the apparatus program 35 extracts the element of <NextURL> of the instruction data received in most recent S14, as address information indicative of the location of the next instruction data. Next, the apparatus program 35 transmits XML request information to the server 70 through the Wi-Fi communication interface 26. Here, the XML request information requests transmission of the XML file identified by a combination of file path information "scan-upload2.xml" and parameter "?jobid=abc&file_type=1" (S13). The parameter "file_type=1" corresponds to designation of the parameter icon 131. That is, the apparatus program 35 transmits, to the server 70, the XML request information including the parameter corresponding to the option selected by the user through the instruction screen. The apparatus program 35 receives the XML file shown in FIG. 4B, as the response to the XML request information, from the server 70 through the Wi-Fi communication interface 26 (S14). The process of S13, S14 using the address information included in the instruction data is an example of a second acquiring process.

Next, when a <Command> tag is described at the beginning of the XML file shown in FIG. 4B, the apparatus program 35 determines that the XML file is an operation instruction XML (S15:No & S16: OPERATION INSTRUCTION). As shown in FIG. 4B, the operation instruction XML includes a <NextURL> tag, a <Scan upload> tag, a <Screen> tag, and an <NFCPUSH> tag, for example. The element of the <NextURL> tag directly below the <Command> tag is an example of first location information.

The <Scan upload> tag is information for identifying a scan upload operation to be performed by the MFP 10. Each of a <Server> tag, a <Resolution> tag, and a <Type> tag that is the element of the <Scan upload> tag corresponds to one of a plurality of items "server", "resolution", and "type" constituting the execution condition of the scan upload operation. The element of the <Server> tag, the <Resolution> tag, and the <Type> tag has a parameter of the corresponding item. More specifically, the elements of the <Server> tag and the <Resolution> tag are parameters "ftp://www.server-c.com" and "300 dpi", respectively, that are fixedly set by an administrator of the server 70. The element of the <Type> tag is a parameter "PDF" selected by the user through the type selection screen shown in FIG. 10A.

The <Screen> tag includes, as the element, information indicative of the instruction screen to be displayed on the display 23 when the scan upload operation is being performed. The <Screen> tag shown in FIG. 4B includes a <Title> tag and a <Message> tag as the elements. The <NFCPUSH> tag shown in FIG. 4B includes a <PUSHURL> tag as the element, and does not include a <NextURL> as the element. The details of the <Screen> tag and the <NFCPUSH> tag are the same as those of FIG. 4A, and repetitive descriptions are omitted.

Next, the apparatus program 35 causes the scanner 12 to perform a scan operation in accordance with parameters "300 dpi" and "PDF" that are the elements of the <Resolution> tag and the <Type> tag of the operation instruction XML. That is, the scanner 12 reads an image recorded on an original document with a reading resolution "300 dpi", generates scan data of the file type "PDF", and temporarily stores the generated scan data in the memory 32. Then, the apparatus program 35 transmits the scan data by FTP, through the Wi-Fi communication interface 26, to the server 90 identified by server identification information "ftp://www.server-c.com" that is the element of the <Server> tag (S22). The scan upload operation is an example of an instruction operation. The process of S22 is an example of an operation instructing process.

Figure 10B:
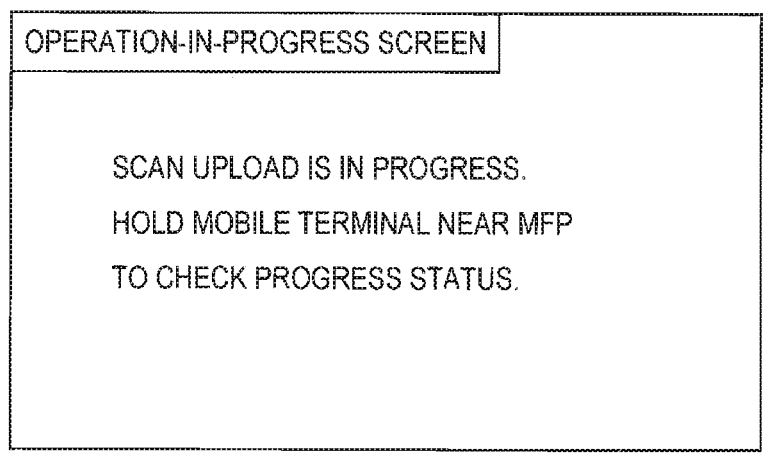

During performing scan upload, the apparatus program 35 causes the display 23 to display an operation-in-progress screen shown in FIG. 10B, in accordance with the element of the <Screen> tag of the operation instruction XML received in most recent S14. The operation-in-progress screen includes a message "Scan upload is in progress. Hold mobile terminal near MFP to check progress status." When the NFC link is established with the mobile terminal 50 (S23:No & S24:Yes), the apparatus program 35 performs a PUSH notifying process (S25). The process of S24 is an example of the connecting process. Hereinafter, detailed descriptions that are the same as the above-described processes are omitted, and different points will be mainly described.

In FIG. 7, first, in response to determining that the MFP 10 is not in the particular state, that the particular screen is not being displayed, and that the XML file received in most recent S14 includes a <PUSHURL> tag (S31:No & S37:No & S38:Yes), the apparatus program 35 extracts the URL that is the element of this <PUSHURL> tag (S39). Next, the apparatus program 35 substitutes a substitute instruction symbol "% localhost %" included in the extracted URL with the IP address "192.168.1.60" allocated to the Wi-Fi communication interface 26 of the MFP 10 (S35), and generates a push URL. The apparatus program 35 then transmits the push URL to the mobile terminal 50 through the NFC communication interface 25 for which the NFC link is established (S36). This process is an example of a first notifying process.

Next, as shown in FIG. 8, the terminal program 65 receives the push URL from the MFP 10 through the NFC communication interface 55 for which the NFC link is established (S41). Next, the terminal program 65 transmits HTML request information through the Wi-Fi communication interface 56 to the MFP 10 identified by the server identification information "192.168.1.60" included in the push URL. Here, the HTML request information requests transmission of the HTML file identified by a combination of file path information "progress.html" and parameter "?jobid=abc" included in the push URL (S42). Note that the "SERVER 70" at the top right in FIG. 8 should be read as "MFP 10" here.

Although not shown in the drawings, in response to receiving the HTML request information from the mobile terminal 50 through the Wi-Fi communication interface 25, the apparatus program 35 generates an HTML file including information indicative of the progress status of the scan upload operation, and transmits the generated HTML file to the mobile terminal 50 through the Wi-Fi communication interface 25. As the response to the HTML request information, the terminal program 65 receives the HTML file transmitted by the MFP 10 through the Wi-Fi communication interface 56 (S43).

Figure 13A:
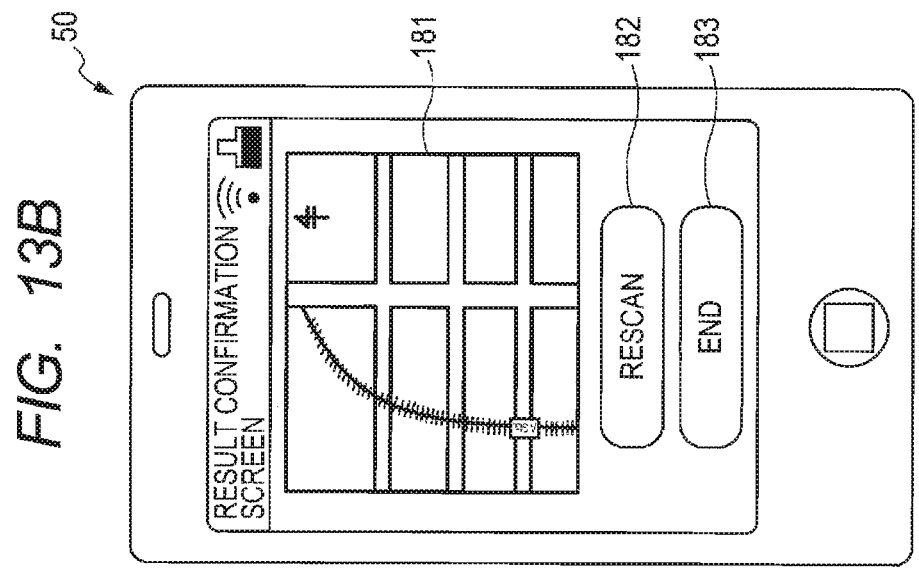

Next, the terminal program 65 causes the display 53 to display a progress report screen shown in FIG. 13A in accordance with the HTML file received in most recent S43 (S44). The progress report screen is an example of an instruction screen for reporting the progress status of the scan upload operation identified by the job ID "abc". The progress report screen includes a message "Scan upload is in progress.", information indicative of the progress status of the scan upload operation (for example, "Scan: completed", "Upload: in progress", a progress bar, and so on), an [Update] icon 171, and an [OK] icon 172.

The terminal program 65 receives a user operation on the progress report screen through the input interface 54. In response to receiving designation of the [Update] icon 171 through the input interface 54, the terminal program 65 again performs the processes of S42 to S44. Thereby, the display 53 displays the progress report screen in which the progress status is updated. In response to receiving designation of the [OK] icon 172 through the input interface 54, the terminal program 65 ends displaying the progress report screen.

Returning to FIG. 6B, the apparatus program 35 continues displaying the operation-in-progress screen until the scan upload operation ends (S23: No), regardless of the NFC link is established with the mobile terminal 50. In response to end of the scan upload operation (S23: Yes), the apparatus program 35 acquires next instruction data (S13 & S14). That is, the apparatus program 35 transmits XML request information to the server 70 through the Wi-Fi communication interface 26. Here, the XML request information requests transmission of the XML file identified by a combination of file path information "scan-upload3.xml" and parameter "?jobid=abc" (S13). The apparatus program 35 then receives the XML file shown in FIG. 5A, as the response to the XML request information, from the server 70 through the Wi-Fi communication interface 26 (S14). These processes are an example of a second acquiring process.

Next, in response to determining that the XML file shown in FIG. 5A is the screen instruction XML (S15:No & S16: SCREEN INSTRUCTION), the apparatus program 35 causes the display 23 to display a result confirmation screen shown in FIG. 11A in accordance with the element of the <Screen> tag of this screen instruction XML (S17). The result confirmation screen is an example of an instruction screen for allowing the user to confirm the execution result of the scan upload operation. The result confirmation screen includes a scan image 141, a [Rescan] icon 142, and an [End] icon 143. The apparatus program 35 then receives a user operation on the result confirmation screen through the input interface 54 (S18).

The scan image 141 is an image represented by scan data generated by the scanner 12 and uploaded to the server 90 in S22. The location of the scan data is identified by address information "www.server-c.com/scan.pdf" that is the element of the <Image> tag. The [Rescan] icon 142 corresponds to an instruction for performing the scan upload operation again. The [End] icon 143 corresponds to an instruction for ending the main process.

In response to receiving designation of the [Rescan] icon 142 through the input interface 54, the apparatus program 35 transmits XML request information to the server 70 through the Wi-Fi communication interface 26. Here, the XML request information requests transmission of the XML file identified by a combination of file path information "scan-upload4.xml" and parameter "?jobid=abc&icon=1" (S13). The parameter "icon=1" corresponds to designation of the [Rescan] icon 142. And, the apparatus program 35 receives the XML file shown in FIG. 4B, as the response to the XML request information, from the server 70 through the Wi-Fi communication interface 26 (S14). The processes in S15 and thereafter have been already described, and repetitive descriptions are omitted.

In response to receiving designation of the [End] icon 143 through the input interface 54, the apparatus program 35 transmits XML request information to the server 70 through the Wi-Fi communication interface 26. Here, the XML request information requests transmission of the XML file identified by a combination of file path information "scan-upload4.xml" and parameter "?jobid=abc&icon=2" (S13). The parameter "icon=2" corresponds to designation of the [End] icon 143. The apparatus program 35 then receives an end instruction XML (not shown) transmitted by the server 70, as the response to the XML request information, through the Wi-Fi communication interface 26 (S14). In response to determining that the <End> tag is described at the beginning of the XML file (S15: Yes), the apparatus program 35 ends the main process.

In response to establishment of the NFC link with the mobile terminal 50 before receiving a user operation through the input interface 24 (S18:No & S19:Yes), the apparatus program 35 performs the PUSH notifying process (S20). In response to determining that the MFP 10 is not in the particular state, that the particular screen is not being displayed, and that the XML file received in most recent S14 includes a <PUSHURL> tag (S31:No & S37:No & S38: Yes), the apparatus program 35 transmits the push URL generated from the element of this <PUSHURL> tag to the mobile terminal 50 through the NFC communication interface 25 for which the NFC link is established (S39, S35, S36).

Next, as shown in FIG. 8, the terminal program 65 receives the push URL from the MFP 10 through the NFC communication interface 55 for which the NFC link is established (S41). Next, the terminal program 65 transmits HTML request information to the server 70 through the Wi-Fi communication interface 56. Here, the HTML request information requests transmission of the HTML file identified by a combination of file path information "result.html" and parameter "?jobid=abc&displayid=003" (S42). The terminal program 65 then receives the HTML file transmitted by the server 70, as the response to the HTML request information, through the Wi-Fi communication interface 56 (S43).

Figure 13B:
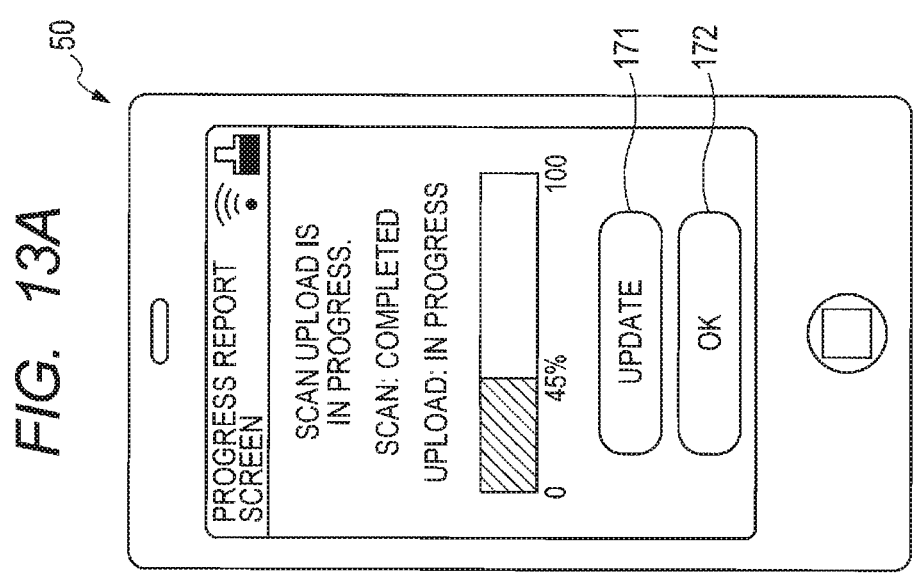

Next, the terminal program 65 causes the display 53 to display the result confirmation screen shown in FIG. 13B, in accordance with the HTML file received in most recent S43 (S44). The result confirmation screen shown in FIG. 13B is an example of an instruction screen including a scan image 181, a [Rescan] icon 182, and an [End] icon 183. The scan image 181, the [Rescan] icon 182, and the [End] icon 183 correspond to the scan image 141, the [Rescan] icon 142, and the [End] icon 143 shown in FIG. 11B. The terminal program 65 receives a user operation on the result confirmation screen through the input interface 54 (S47).

Next, in response to receiving designation of the [Rescan] icon 182 or the [End] icon 183 through the input interface 54 (S47), the terminal program 65 transmits operation information to the server 70 through the Wi-Fi communication interface 56 (S48). The operation information is an example of a parameter indicative of the content of a user operation on the result confirmation screen. The operation information includes both a job ID "abc" included in the push URL received in S41 and icon information indicative of the designated icon, for example. For example, the icon information corresponding to the [Rescan] icon 182 is "icon=1", and the icon information corresponding to the [End] icon 183 is "icon=2".

Returning to FIG. 6B, in response to determining that a <NextURL> tag is included in the element of the <NFC-PUSH> tag in FIG. 5A (S21:Yes), the apparatus program 35 extracts the element of this <NextURL> and acquires next instruction data (S13&S14) without waiting for a user operation on the result confirmation screen. That is, the apparatus program 35 transmits XML request information to the server 70 through the Wi-Fi communication interface 26. Here, the XML request information requests transmission of the XML file identified by a combination of file path information "scan-upload5.xml" and parameter "?jobid=abc" (S13). The apparatus program 35 then receives the XML file shown in FIG. 5B, as the response to the XML request information, from the server 70 through the Wi-Fi communication interface 26 (S14).

Next, in response to determining that the XML file shown in FIG. 5B is the screen instruction XML (S15:No & S16: SCREEN INSTRUCTION), the apparatus program 35 causes the display 23 to display a waiting screen shown in FIG. 11B in accordance with the element of the <Screen> tag of this XML file (S17). The waiting screen is an example of an instruction screen for prompting a user operation on the result confirmation screen displayed on the display 53 of the mobile terminal 50. The waiting screen includes a message "Operate mobile terminal."

Next, the apparatus program 35 extracts the <NextURL> tag included in the XML file shown in FIG. 5B, and performs the processes in S45 and thereafter shown in FIG. 8. That is, the apparatus program 35 transmits XML request information to the server 70 through the Wi-Fi communication interface 26. Here, the XML request information requests transmission of the XML file identified by a combination of file path information "scan-upload6.xml" and parameter "?jobid=abc" (S45). The XML request information transmitted in S45 is an example of second request information.

In response to receiving the XML request information from the MFP 10 before receiving operation information from the mobile terminal 50 (S45), the server 70 transmits a waiting instruction XML (not shown) to the MFP 10 (S46). In other words, until receiving operation information including the job ID "abc", the server 70 returns the waiting instruction information to the XML request information including the job ID "abc". The waiting instruction XML is information for instructing transmitting the same XML request information (FIG. 5B) again after a particular period has elapsed.

On the other hand, in response to receiving the XML request information from the MFP 10 after receiving operation information from the mobile terminal 50 (S49), the server 70 transmits, to the MFP 10, the XML file corresponding to the operation information (S50). In other words, after receiving the operation information including the job ID "abc", the server 70 returns the XML file corresponding to the operation information, in response to the XML request information including the job ID "abc". For example, the server 70 of the embodiment returns the operation instruction XML shown in FIG. 4B as the XML file corresponding to the [Rescan] icon 182, and returns the end instruction XML (not shown) as the XML file corresponding to the [End] icon 183.

Next, in response to receiving the waiting instruction XML from the server 70 through the Wi-Fi communication interface 26 (S46), the apparatus program 35 again transmits the XML request information after a particular period elapses (S45/S49). After a user operation is performed on the result confirmation screen of the mobile terminal 50, the apparatus program 35 receives the XML file corresponding to the operation information, through the Wi-Fi communication interface 26, from the server 70 (S50). The processes thereafter are the same as the process in S15, and repetitive descriptions are omitted.

That is, in S45 and S49 the apparatus program 35 repeatedly transmits the XML request information to the server 70 through the Wi-Fi communication interface 26 until receiving the instruction data (XML file). The XML request information requests transmission of the XML file identified by the operation information transmitted from the mobile terminal 50 to the server 70. The processes of S45 and S49 are an example of a second transmitting process. The process of S50 is an example of a receiving process. The processes of S45, S49, and S50 are an example of a second acquiring process.

EFFECTS OF THE EMBODIMENT

According to the above-described embodiment, when an extended program realized by sequentially performing a plurality of instruction data is being performed, notification data to be transmitted to the mobile terminal 50 is included in the instruction data. In other words, it is unnecessary to preliminarily store all the URLs that can be transmitted in S36 in the memory 32. Thus, without needing cumbersome preliminary preparation, various notification data depending on the state of the MFP 10 can be transmitted to the mobile terminal 50 by NFC communication.

Further, in the instruction data of the above-described embodiment, the <NextURL> tag can be set directly below the <Screen> tag or the <Command> tag and directly below the <NFCPUSH> tag. Thereby, when the instruction screen including a plurality of options is being displayed, different instruction data can be acquired depending on a user operation designating an option and on near-field wireless connection with the mobile terminal 50. Thus, various services can be received.

According to the above-described embodiment, it is possible to transmit the XML request information including the parameter corresponding to the option designated by the user, and to receive next instruction data identified by this parameter. Thus, next instruction data can be acquired depending on the option designated by the user, and various services can be received.

Figure 11A:
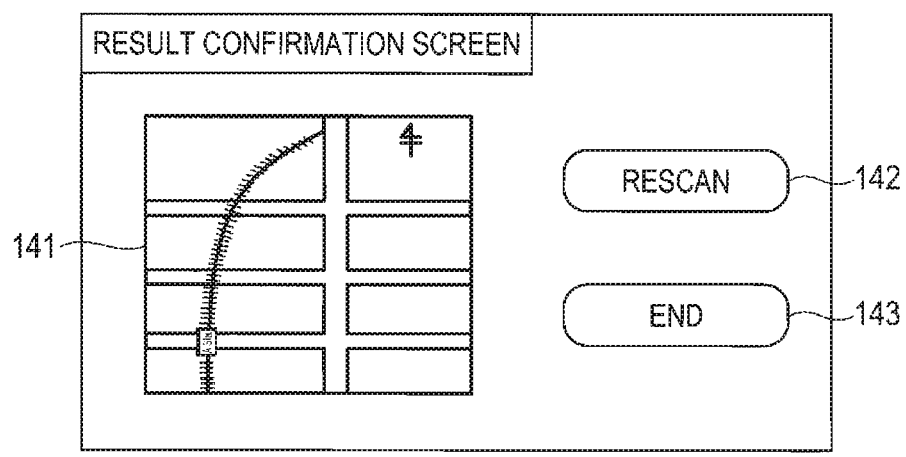
Figure 11B:
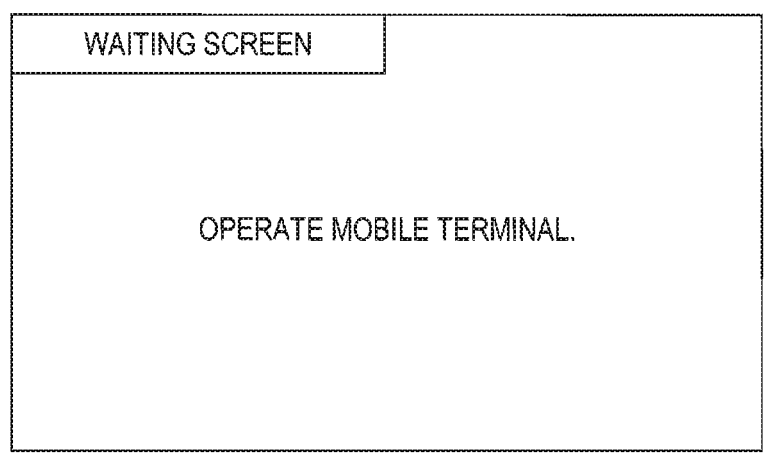

According to the above-described embodiment, by holding the mobile terminal 50 near the MFP 10 that is displaying the result confirmation screen shown in FIG. 11A, the result confirmation screen shown in FIG. 13B is displayed on the mobile terminal 50. In this way, the MFP 10 of the embodiment enables the mobile terminal 50 to perform the process of receiving designation of an option, and receives, from the server 70, instruction data corresponding to the received option. This allows the user to perform a work that is difficult on the display 23 of the MFP 10 having a relatively small screen size, by using the display 53 of the mobile terminal 50 having a relatively large screen size, for example.

According to the above-described embodiment, the notification data stored in the memory 32 is transmitted to the mobile terminal 50 prior to the notification data included in the instruction data. Thereby, the instruction data need not include all the notification data corresponding to the particular state or particular screen. Thus, the burden of development of the instruction data is reduced.

As one example, the particular state is a state where the MFP 10 cannot fulfill its function, for example. That is, there is a possibility that the MFP 10 in the particular state cannot perform the extended program to the end. In this case, it is preferable to transmit a preset notification data for solving the particular state, rather than notification data included in the instruction data. As another example, the particular screen is a screen stored in the screen list at the time of shipment of the MFP 10. That is, notification data to be transmitted at the time of displaying the particular screen may be preliminarily stored in the memory 32, without acquiring from the external apparatus.

According to the above-described embodiment, the customize URL inputted by the user can be stored in the memory 32 in association with the state ID or the screen data. Thereby, instead of the notification data stored at the time of shipment of the MFP 10, notification data desired by the user can be transmitted to the mobile terminal 50. As a result, a larger variety of notification data can be transmitted to the mobile terminal 50.

The mobile terminal 50 of the above-described embodiment receives a URL as the notification data from the MFP 10, and receives instruction data indicated by the URL from the server 70. Thereby, by changing the instruction data corresponding to notification data at the server 70, the process to be performed by the mobile terminal 50 can be changed easily without changing notification data in the memory 32 or in the instruction data. However, a specific example of the notification data is not limited to a URL, but the notification data may be instruction data itself. Thereby, the mobile terminal 50 having received the notification data does not need to access the server 70.

According to the above-described embodiment, a parameter can be added to notification data. Thus, the mobile terminal 50 can perform an appropriate operation based on the state of the MFP 10. The specific example of the parameter added to notification data is not limited to an IP address. For example, the parameter may be information indicative of the state of the printer 11 or the scanner 12 detected by a sensor (not shown), or may be the operation history of the printer 11 or the scanner 12.

While the disclosure has been described in detail with reference to the above aspects thereof, it would be apparent to those skilled in the art that various changes and modifications may be made therein without departing from the scope of the claims.

For example, the sequence of performing each process described above may be changed appropriately.

The screen displayed on the display 53 of the mobile terminal 50 based on notification data is not limited to the examples shown in FIGS. 12A to 13B. Other examples of the instruction screen displayed on the mobile terminal 50 may an advertisement screen prompting purchase of a new MFP 10, an introduction screen that introduces an extended program newly stored in the server 70, and so on. Further, the operation performed by the mobile terminal 50 based on notification data is not limited to displaying a screen on the display 53. For example, the operation performed by the mobile terminal 50 may be identified by information shown at the beginning of notification data (for example, "http://", "mailto:", "tel:", and "pos:").

More specifically, the notification data to which "http://" is added at the beginning thereof indicates an operation of causing the display 53 to display a screen indicated by an XML file or an HTML file, for example. The notification data to which "mailto:" is added at the beginning thereof indicates an operation of causing a mail client program (not shown) to transmit electronic mail, for example. The notification data to which "tel:" is added at the beginning thereof indicates an operation of causing a telephone unit (not shown) to call a particular telephone number, for example. The notification data to which "pos:" is added at the beginning thereof indicates an operation of acquiring position information of the mobile terminal 50 through a GPS antenna (not shown), for example.

In the above-described embodiment, an example is described in which the XML file is received from the server 70. However, the location from which the XML file is acquired is not limited to the server 70. As an example, the MFP 10 may have a mount interface on which a portable storage medium such as a USB memory is detachably mounted. And, the apparatus program 35 may read out the XML file from the USB memory mounted on the mount interface. As another example, the XML file may be stored in the memory 32. And, the apparatus program 35 may read out the XML file from the memory 32. These are examples of a first acquiring process and a second acquiring process.

In the above-described embodiment, in the PUSH notifying process shown in FIG. 7, the apparatus program 35 determines whether the MFP 10 is in a particular state and whether the MFP 10 is displaying a particular screen (S31, S37). However, the apparatus program 35 may perform only one of determination steps S31 and S37.

In the above-described embodiment, an example is described in which the CPU 31 in the MFP 10, as the processor, performs various programs stored in the memory 32, thereby realizing each process of this disclosure. However, the configuration of the controller (the CPU 31 and the memory 32) is not limited to this, and a part or an entirety of the controller may be realized by hardware such as an integrated circuit.

This disclosure may be realized as the MFP 10, or may be realized as a program that causes the MFP 10 to perform processes. This program may be provided by being recorded on a non-transitory recording medium. The non-transitory recording medium may include a CD-ROM, a DVD-ROM, and so on, as well as a memory provided in a server that can be connected to the MFP 10 through a communication network. And, the program stored in the memory of the server may be delivered as information or signals indicative of this program, through a communication network such as the Internet 101.

What is claimed is:

1. An image processing apparatus comprising:
a display;
an image processor configured to perform an image processing operation of image data;
a first communication interface;
a processor; and
a memory storing instructions, the instructions, when executed by the processor, causing the processor to perform:
acquiring instruction data, the instruction data including notification data and location information indicative of a location of next instruction data;
controlling at least one of the display and the image processor to perform an operation instructed by the instruction data acquired most recently;
when controlling the at least one of the display and the image processor, connecting the first communication interface with a mobile terminal within a particular distance range from the image processing apparatus, in accordance with a near-field wireless communication protocol;
when controlling the at least one of the display and the image processor, transmitting the notification data extracted from the instruction data acquired most recently, to the mobile terminal through the first communication interface, the notification data being data for specifying an operation to be performed by the mobile terminal; and
acquiring the next instruction data based on the location information extracted from the instruction data acquired most recently,
wherein the instruction data includes:
screen instruction data indicative of an instruction screen that is displayed on the display; and
operation instruction data indicative of an execution condition of the image processing operation; and
wherein the memory further stores instructions, when executed by the processor, causing the processor to perform;
determining whether the instruction data acquired most recently is the screen instruction data or the operation instruction data; and
wherein the controlling the at least one of the display and the image processor includes:
in response to determining that the instruction data acquired most recently is the screen instruction data, controlling the display to display the instruction screen indicated by the screen instruction data; and
in response to determining that the instruction data acquired most recently is the operation instruction data, controlling the image processor to perform the image processing operation in accordance with the execution condition indicated by the operation instruction data.

2. The image processing apparatus according to claim 1, wherein the memory is configured to store the notification data and state identification information in association with each other, the state identification information being indicative of a particular state of the image processor; and
wherein the memory further stores instructions, when executed by the processor, causing the processor to perform:
in response to connecting with the mobile terminal, determining whether the image processor is in the particular state;
in response to determining that the image processor is not in the particular state, transmitting the notification data to the mobile terminal through the first communication interface; and
in response to determining that the image processor is in the particular state, transmitting particular notification data to the mobile terminal through the first communication interface, the particular notification data being associated with the state identification information corresponding to the particular state.

3. The image processing apparatus according to claim 2, wherein the memory is configured to store first notification data in association with the state identification information, the first notification data being the particular notification data that is preset to the image processing apparatus;
wherein the memory is configured to further store second notification data in association with the state identification information, the second notification data being the particular notification data inputted by a user;

wherein the memory further stores instructions, when executed by the processor, causing the processor to perform:
  in response to determining that the image processor is in the particular state, determining whether the memory stores the second notification data associated with the state identification information corresponding to the particular state; and
wherein the transmitting the second notification data includes:
  in response to determining that the memory does not store the second notification data, transmitting, to the mobile terminal, the first notification data associated with the state identification information; and
  in response to determining that the memory stores the second notification data, transmitting, to the mobile terminal, the second notification data associated with the state identification information.

4. The image processing apparatus according to claim 1, further comprising an input interface,
wherein the screen instruction data includes:
  a plurality of options to be displayed on the instruction screen;
  first location information serving as the location information; and
  second location information serving as the location information and different from the first location information;
wherein the memory further stores instructions, when executed by the processor, causing the processor to:
  when the instruction screen is displayed, perform one of:
    connecting the first communication interface with the mobile terminal; and
    receiving, through the input interface, a user operation of designating one of the plurality of options displayed on the instruction screen; and
wherein the acquiring the next instruction data includes:
  in response to receiving the user operation, acquiring next instruction data of which the location is indicated by the first location information; and
  in response to connecting the first communication interface with the mobile terminal, acquiring next instruction data of which the location is indicated by the second location information.

5. The image processing apparatus according to claim 4, further comprising a second communication interface,
wherein each of the acquiring the instruction data and the acquiring the next instruction data includes:
  transmitting first request information to a server through the second communication interface, the first request information requesting transmission of the instruction data of which a location is indicated by the location information; and
  receiving the instruction data from the server through the second communication interface; and
wherein the memory further stores instructions, when executed by the processor, causing the processor to perform:
  when transmitting the first request information immediately after an option is designated through the input interface, transmitting the first request information including a parameter corresponding to the option; and
  when receiving the instruction data, receiving the instruction data identified by a combination of the location information and the parameter included in the first request information.

6. The image processing apparatus according to claim 5, wherein the notification data included in the screen instruction data instructs an operation of transmitting, to the server, the parameter corresponding to the option designated through the mobile terminal out of the plurality of options included in the screen instruction data; and
wherein the acquiring the next instruction data includes:
  when transmitting the notification data extracted from the screen instruction data, repeatedly transmitting second request information to the server through the second communication interface until the instruction data is received, the second request information requesting transmission of the instruction data identified by the parameter transmitted from the mobile terminal to the server.

7. The image processing apparatus according to claim 4, wherein the instruction data is a text format file used for an extended program of the image processing apparatus;
wherein the first location information is provided directly below a first tag indicative of the screen instruction data; and
wherein the second location information is provided directly below a second tag indicative of the notification data.

8. The image processing apparatus according to claim 1, wherein the memory is configured to store the notification data and screen data in association with each other, the screen data being indicative of a particular screen to be displayed on the display; and
wherein the memory further stores instructions, when executed by the processor, causing the processor to perform:
  controlling the display to display the particular screen indicated by the screen data;
  in response to connecting with the mobile terminal, determining whether the particular screen is displayed on the display;
  in response to determining that the particular screen is not displayed, transmitting the notification data extracted from the instruction data acquired most recently, to the mobile terminal through the first communication interface; and
  in response to determining that the particular screen is displayed, transmitting particular notification data associated with the screen data indicative of the particular screen, to the mobile terminal through the first communication interface.

9. The image processing apparatus according to claim 1, wherein the notification data is location information indicative of a location of display data stored in a server, the display data being data for displaying a screen on a display of the mobile terminal.

10. The image processing apparatus according to claim 1, wherein the transmitting the notification data to the mobile terminal includes transmitting, to the mobile terminal, the notification data to which a parameter indicative of a state of the image processing apparatus is added.

11. The image processing apparatus according to claim 1, further comprising a second communication interface,
wherein the image processor comprises a scanner and a printer; and
wherein the memory further stores instructions, when executed by the processor, causing the processor to:
  sequentially perform a plurality of instruction data including the instruction data and the next instruction data, thereby performing an extended program of the image processing apparatus, the extended program including at least one of:
  a scan upload program of causing the scanner to read an image and transmitting image data generated by the scanner to a server through the second communication interface; and
  a download print program of receiving image data from a server through the second communication interface and causing the printer to record an image represented by the image data on a sheet.

12. A non-transitory computer-readable storage medium storing a set of program instructions executable on an image processing apparatus having a display, an image processor configured to perform an image processing operation of image data, and a first communication interface, the set of program instructions comprising:
  acquiring instruction data, the instruction data including notification data and location information indicative of a location of next instruction data;
  controlling at least one of the display and the image processor to perform an operation instructed by the instruction data acquired most recently;
  when controlling the at least one of the display and the image processor, connecting the first communication interface with a mobile terminal within a particular distance range from the image processing apparatus, in accordance with a near-field wireless communication protocol;
  when controlling the at least one of the display and the image processor, transmitting the notification data extracted from the instruction data acquired most recently, to the mobile terminal through the first communication interface, the notification data being data for specifying an operation to be performed by the mobile terminal; and
  acquiring the next instruction data based on the location information extracted from the instruction data acquired most recently,
  wherein the instruction data includes:
    screen instruction data indicative of an instruction screen that is displayed on the display; and
    operation instruction data indicative of an execution condition of the image processing operation; and
  wherein the set of program instructions further comprising:
    determining whether the instruction data acquired most recently is the screen instruction data or the operation instruction data; and
  wherein the controlling the at least one of the display and the image processor includes:
    in response to determining that the instruction data acquired most recently is the screen instruction data, controlling the display to display the instruction screen indicated by the screen instruction data; and
    in response to determining that the instruction data acquired most recently is the operation instruction data, controlling the image processor to perform the image processing operation in accordance with the execution condition indicated by the operation instruction data.

13. An image processing apparatus comprising:
  a display;
  an image processor configured to perform an image processing operation of image data, the image processor comprising a scanner and a printer;
  a first communication interface;
  a second communication interface;
  a processor; and
  a memory storing instructions, the instructions, when executed by the processor, causing the processor to perform:
    acquiring instruction data, the instruction data including notification data and location information indicative of a location of next instruction data;
    controlling at least one of the display and the image processor to perform an operation instructed by the instruction data acquired most recently;
    when controlling the at least one of the display and the image processor, connecting the first communication interface with a mobile terminal within a particular distance range from the image processing apparatus, in accordance with a near-field wireless communication protocol;
    when controlling the at least one of the display and the image processor, transmitting the notification data extracted from the instruction data acquired most recently, to the mobile terminal through the first communication interface, the notification data being data for specifying an operation to be performed by the mobile terminal; and
  acquiring the next instruction data based on the location information extracted from the instruction data acquired most recently,
  wherein the memory further stores instructions, when executed by the processor, causing the processor to:
    sequentially perform a plurality of instruction data including the instruction data and the next instruction data, thereby performing an extended program of the image processing apparatus, the extended program including at least one of:
      a scan upload program of causing the scanner to read an image and transmitting image data generated by the scanner to a server through the second communication interface; and
      a download print program of receiving image data from a server through the second communication interface and causing the printer to record an image represented by the image data on a sheet.

* * * * *